(12) United States Patent
Rashkin

(10) Patent No.: US 11,599,936 B2
(45) Date of Patent: Mar. 7, 2023

(54) MIXED REALITY SYSTEM WITH TRACKING DEVICES AND VIRTUAL HOLOGRAMS

(71) Applicant: David Rashkin, Carson City, NV (US)

(72) Inventor: David Rashkin, Carson City, NV (US)

( * ) Notice: Subject to any disclaimer, the term of this patent is extended or adjusted under 35 U.S.C. 154(b) by 241 days.

(21) Appl. No.: 16/950,485

(22) Filed: Nov. 17, 2020

(65) Prior Publication Data
US 2022/0156825 A1    May 19, 2022

(51) Int. Cl.
| | | |
|---|---|---|
| *G06Q 30/06* | (2023.01) | |
| *A61H 19/00* | (2006.01) | |
| *G02B 27/01* | (2006.01) | |
| *G06T 19/00* | (2011.01) | |
| *H04W 4/80* | (2018.01) | |
| *G02B 27/00* | (2006.01) | |
| *G06Q 30/0601* | (2023.01) | |

(52) U.S. Cl.
CPC ......... *G06Q 30/0643* (2013.01); *A61H 19/30* (2013.01); *G02B 27/0093* (2013.01); *G02B 27/017* (2013.01); *G06T 19/006* (2013.01); *H04W 4/80* (2018.02); *G02B 27/0103* (2013.01)

(58) Field of Classification Search
None
See application file for complete search history.

(56) References Cited

U.S. PATENT DOCUMENTS

| | | | | |
|---|---|---|---|---|
| 10,685,488 | B1* | 6/2020 | Kumar | A61H 23/04 |
| 10,852,828 | B1* | 12/2020 | Gatson | G06F 3/014 |
| 2012/0281849 | A1* | 11/2012 | Hamada | A63F 13/235 381/63 |
| 2018/0307397 | A1* | 10/2018 | Hastings | G06F 3/0484 |

* cited by examiner

*Primary Examiner* — Ifedayo B Iluyomade
(74) *Attorney, Agent, or Firm* — Mark Goodman; Goodman Law Center

(57) ABSTRACT

A mixed reality system for displaying virtual holograms using a head mounted display and a tracking device. The HMD has one or more cameras mounted on its exterior connected to a portable computing device. The cameras record what a user's eyes would see in the environment and project the images onto the screen panel display. The cameras also transmit tracking device data to a software application installed on a portable computing device. Light emitting diodes serve as tracking points for the detection algorithm. The tracking device can be configured to transmit data to the portable computing device via optical modulation. Less private radio frequency technologies can be employed such as Bluetooth or WiFi to enable one-way or two-way communication. In some embodiments, multiplexing can be implemented to enable identifying and differentiating multiple tracking devices in a single frame.

2 Claims, 9 Drawing Sheets

MIXED REALITY SYSTEM WITH TRACKING DEVICES AND VIRTUAL HOLOGRAMS

CROSS-REFERENCE TO RELATED APPLICATIONS

This is a Nonprovisional Utility U.S. Patent Application under 37 CFR 1.53(b).

BACKGROUND OF THE INVENTION

1. Field of the Invention

The present invention relates generally to mixed reality systems. More particularly, the present invention relates to using cameras on a head mounted device to detect tracking devices and superimpose images on a screen display.

2. Description of Related Art

Virtual reality, augmented reality, and mixed reality devices are becoming more prevalent and providing users with an opportunity to interact with holograms in a variety of ways. Some systems in the field have external cameras for detecting tracking devices. Other systems use head mounted devices to display virtual reality or augmented reality environments.

There is a need in the field for a mixed reality system with a head mounted device with cameras that can capture information from tracking devices, enabling a user to view and interact with 3D objects within various environments.

SUMMARY OF THE INVENTION

A mixed reality system for displaying virtual holograms using a head mounted display (HMD) and a tracking device is disclosed herein. The HMD has one or more cameras mounted on its exterior operatively connected to a portable computing device. The cameras record what a user's eyes would see in the environment and project the images onto the screen panel display. The cameras also transmit tracking device data to a software application installed on a portable computing device. The tracking device includes a plurality of light emitting diodes (LEDs). The LEDs serve as tracking points for the detection algorithm. Several different methods of technology can be implemented to enable communication between the tracking device and the portable computing device. For example, the tracking device can be configured to transmit data to the portable computing device via optical modulation. Less private radio frequency (RF) technologies can be employed such as Bluetooth or WiFi to enable one-way or two-way communication. In some embodiments of the mixed reality system, multiplexing can be implemented. Multiplexing is defined as identifying and differentiating multiple tracking devices in a single frame.

There are many possible uses of mixed reality systems utilizing the HMD and different tracking devices. The HMD can be connected to the Internet and linked to an online shopping account of a user. While browsing a product online, a user can click a button and a 3D model of the product is sent to the HMD. This enables a user to view the 3D model superimposed on a layout of the user's home displayed on the screen panel. In another example, a tracking device can be mounted on a handle of a gaming device for use in playing a video game. A 3D model of an object such as a sword, lightsaber, gun, and the like can be generated by a rendering algorithm and superimposed on the screen panel display. In another example, a tracking device can in be mounted to a sex toy device. Virtual pets corresponding to tracking devices can be displayed as 3D models on a user's screen panel. Other systems can allow users to wear tracking devices be represented by avatars on their screen panel displays.

These and other features and advantages will be apparent from reading of the following detailed description and review of the associated drawings. It is to be understood that both the forgoing general description and the following detailed description are explanatory and do not restrict aspects as claimed.

DETAILED DESCRIPTION OF EMBODIMENTS

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising," or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable. A "computing device" can be a laptop, tablet, cell phone, and the like. "Plurality" is defined as more than one when used to describe a quantity in the description and claims.

Figure 1:
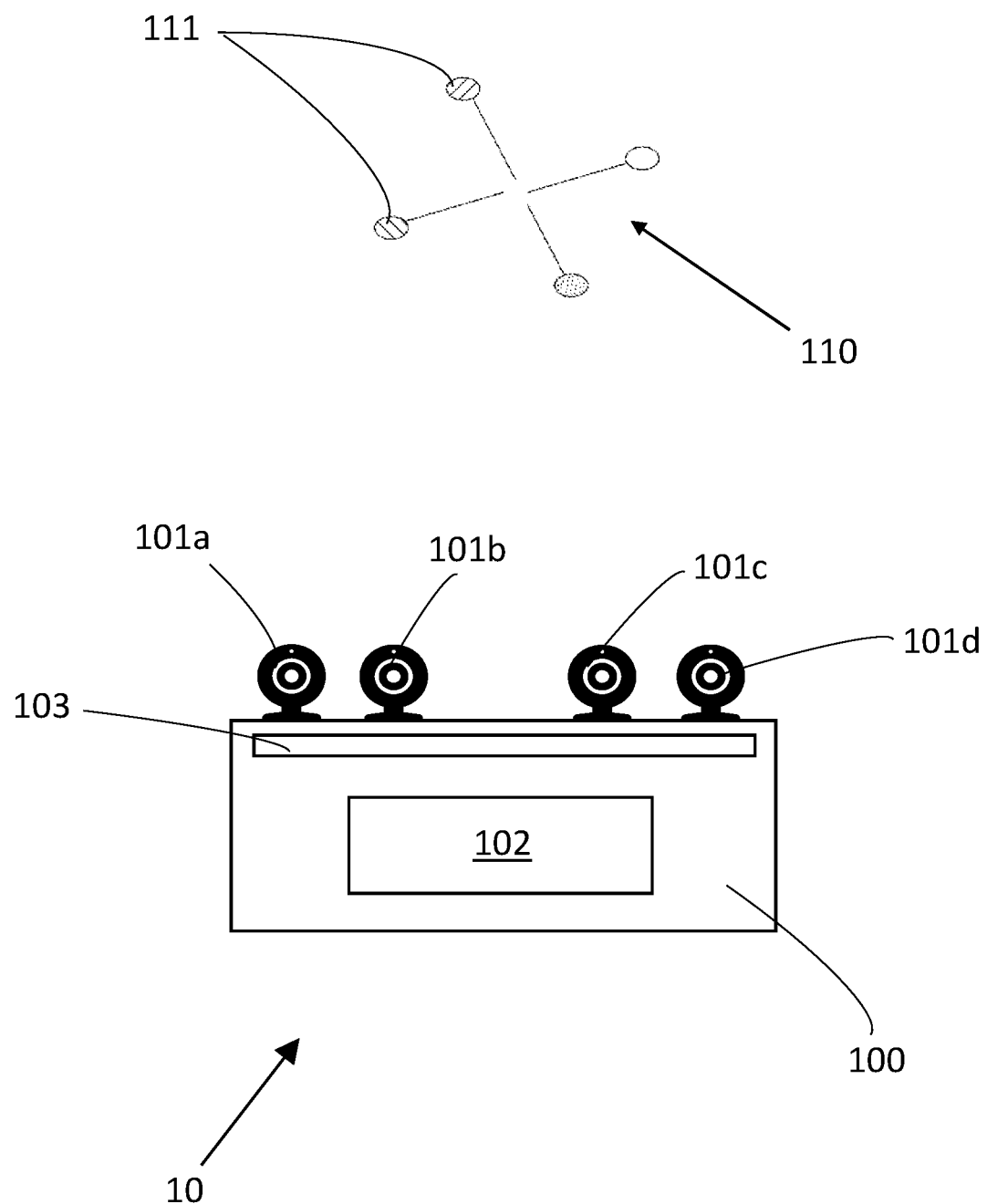
FIG. 1 illustrates an overhead view of a mixed reality system including a head mounted display (HMD) and a tracking device.

FIG. 1 illustrates an overhead view of a mixed reality system 10 including a head mounted display (HMD) 100 and a tracking device 110. "Mixed reality" refers to combinations of virtual reality and augmented reality. A user can wear an HMD 100 viewing the real world on a screen display while also interacting and viewing virtual objects superimposed into the real world display. For example, the HMD device 100 can be a mixed reality device such as Google Cardboard, Samsung HMD Odyssey, HTC Vive, and the like. The HMD 100 includes at least one camera 101a mounted thereon and additional cameras can be implemented. The HMD 100 further includes a portable computing device 102 and a display 103. Some examples of portable computing devices 102 that can be implemented include the Raspberry Pi, Orange Pi Prime, Banana Pi M3, Rock64, and the like. The display 103 can be a screen panel 103 for displaying projected images for a user to view. The portable computing device 102 is operatively connected to the HMD 100 and includes a battery power supply. The portable computing device 102 further includes a processor, a memory, and a software application. The software application includes a detection algorithm, a rendering algorithm, and a scripting algorithm.

A plurality (more than one) of cameras 101 are mounted to the HMD 100 and operatively connected to the portable computing device 102. One, two, three or four cameras 101 are preferably implemented and mounted to a front side of the HMD 100. The cameras 101 record (image data) what a user's eyes would see in the environment and project the images onto the screen panel display 103. The cameras 101 also transmit tracking device data to the detection algorithm of the software application. "Image data" refers to the visual information captured from the environment and "tracking device data" refers to the information captured from tracking devices 110. If a single camera 101 is employed, the portable computing device 102 requires a high speed and powerful processor to enable image resolutions greater than 480 pixels (480 p). In an embodiment with two cameras 101, one low resolution camera 101a can be used to transmit tracking device data to the detection algorithm and a second higher resolution camera 101b can be used to transmit image data drive the screen panel display 103. In an example two camera 101a, 101b embodiment, the detection algorithm does not require as much processor power as a single camera embodiment while the system still provides high resolution images to the display 103. In a four camera 101a-101d embodiment, two high resolution cameras 101c, 101d can each evenly transmit image data to drive one half of the screen panel display 103. The third and fourth cameras 101a, 101b can be low resolution cameras that transmit tracking device data to the detection algorithm.

The tracking device 110 can include a plurality of light emitting diodes (LEDs) 111. Preferably, the tracking device includes between four to six multi-color LEDs 111 placed at right angles to each other to create orthogonal vectors. The LEDs 111 serve as tracking points for the detection algorithm. Several different methods of technology can be implemented to enable communication between the tracking device 110 and the portable computing device 102. For example, the tracking device 110 can be configured to transmit data to the portable computing device 102 via optical modulation. One-way communication using optical modulation can be used to transmit stored model data. With private one-way communication, the mixed reality system 10 can fully function entirely offline with all network and wireless interfaces disabled.

Less private radio frequency (RF) technologies can be employed such as Bluetooth or WiFi to enable one-way or two-way communication. If two-way communication between the tracking device 110 and the computing device 102 is desired, less private RF technologies must be implemented. With a two-way communication system, both the tracking device 110 and the computing device 102 are configured to transmit and receive RF transmissions. Enabling two-way communication enhances the detection algorithm at the expense of requiring additional circuitry and reducing privacy. For example, two-way communication can enable the tracking device 110 to change the colors of the LEDs 111 based on feedback received from the detection algorithm of the computing device 102.

In some embodiments of the mixed reality system, multiplexing can be implemented. Multiplexing is defined as identifying and differentiating multiple tracking devices 110 in a single frame. To enable multiplexing, an additional bank of LEDs 111 or a small screen panel is often required. Alternatively, instead of adding additional circuitry and electrical components, the LEDs 111 can be modulated using Amplitude Shift Keying (ASK), i.e. blinking LEDs 111 in a pattern, Frequency Shift Keying (FSK), i.e. changing colors of LEDs 111, and/or possibly using orthogonal chip codes. The required camera frame rate can be calculated using the maximum expected data throughput according to the modulation scheme used (e.g. ASK, FSK), the amount of data required to be transmitted, and the maximum acceptable data transmission/reception delay. When multiplexing is enabled, the amount of data required can be low, as in an example employing a unique identification code.

Figure 2:
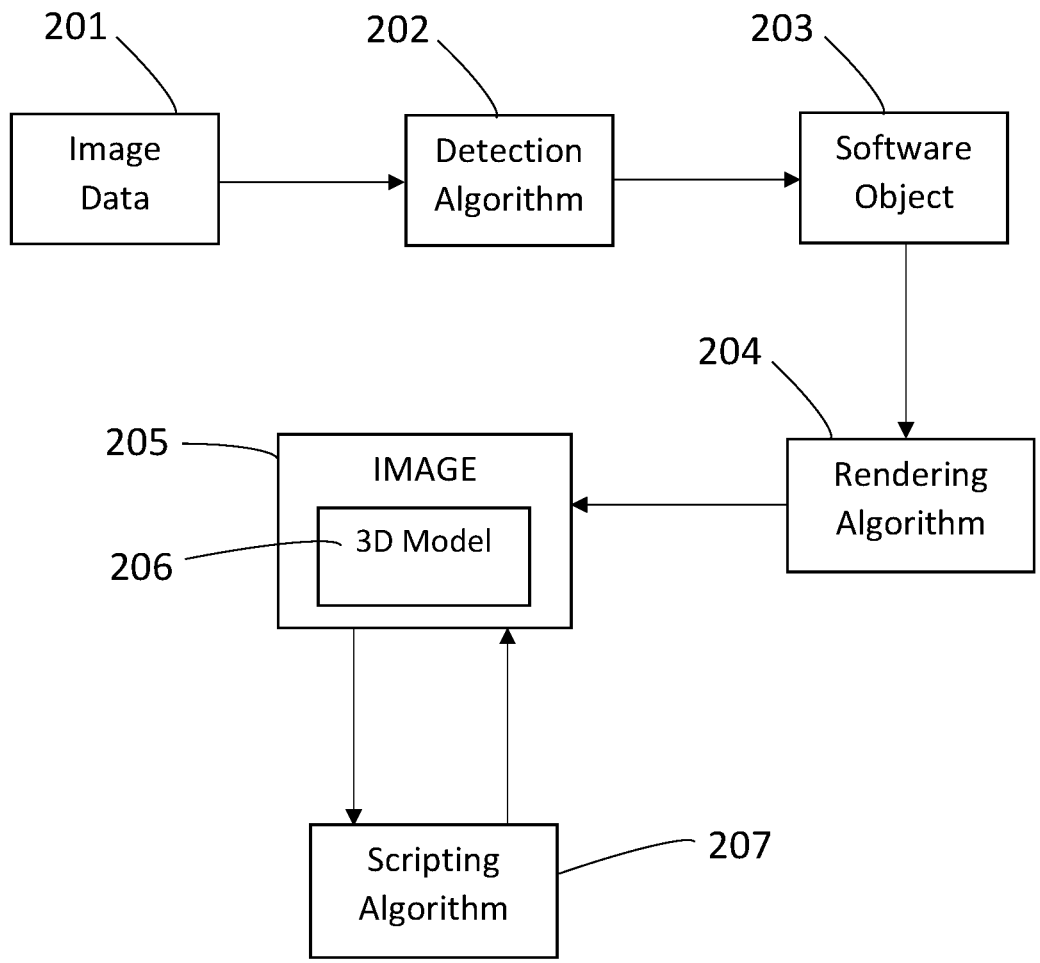
FIG. 2 illustrates a logic flow diagram for software installed in a computing device of a mixed reality system.

FIG. 2 illustrates a logic flow diagram 250 for software installed in a computing device 102 of a mixed reality system 10. As aforementioned, the tracking device 110 includes LEDs 111 that serve as tracking points for the detection algorithm 202. The software detection algorithm 202 receives (input) image frame data 201 from the camera (or cameras) 101. The detection algorithm outputs a software object 203 including position, scale, rotation, and orientation of the tracking device 110. To determine the position of the tracking device 110, the detection algorithm examines the image pixels and identifies the locations of each LED 111 based on color intensity. The color of each LED 111 is configured to be easily distinguishable from one another and from the local environment. To increase the accuracy of the detection algorithm 202, a spectral analysis of the image data input 201 can be performed to determine the least-present colors (optimal for LEDs 111) in the environment. With two-way communication enabled, the detection algorithm can transmit information (feedback) to the tracking device 110 to change the colors of the LEDs 111.

After the position of each LED 111 is determined, the detection algorithm 202 determines the scale by taking the largest vector size as a percentage of the total image size. This method provides an approximation of the distance between the HMD 100 and the tracking device 110. If the largest vector size is a high percentage of the total image size, it means the HMD 100 is closer to the tracking device 110. Conversely, a smaller percentage means the HMD 100 is further away from the tracking device 110. Further, the rotation and orientation of the tracking device 110 are determined using trigonometric functions applied to the coordinates of the positions of the LEDs 111 in the image frame data 201. To determine these various parameters (position, scale, rotation, and orientation), a neural network could be implemented and trained (e.g. a multilayer perceptron) and could significantly reduce the processing time required.

As illustrated in FIG. 2, a rendering algorithm 204 receives (input) the software object 203 including position, scale, rotation, and orientation of the tracking device 110. The rendering algorithm 204 generates an image 205 including a translated, scaled, and rotated three-dimensional (3D) model 206 on a transparent background. The image 205 is outputted by the rendering algorithm 204 and superimposed on top of a camera stream displayed on the screen panel display 103. Consequently, a user views a 3D model 206 in place of the tracking device 110 on the screen panel 103. As the cameras 101 of the HMD 100 capture the tracking device 110 from many distances and angles, the user views a 3D model 206 from equivalent distances and angles.

A scripting algorithm 207 receives input of the image 205 including the 3D model 206 on a transparent background. The scripting algorithm 207 can anchor the 3D model 206 to any point on the screen panel 103 relative to the LED 111 locations. The scripting algorithm can also receive scripts, input (e.g. vocal) from the user, and/or artificial intelligence. Based on the various inputs received, the scripting algorithm 207 can animate the 3D model 206, and/or enable the model 206 to speak (or provide other audio feedback).

Figure 3A:
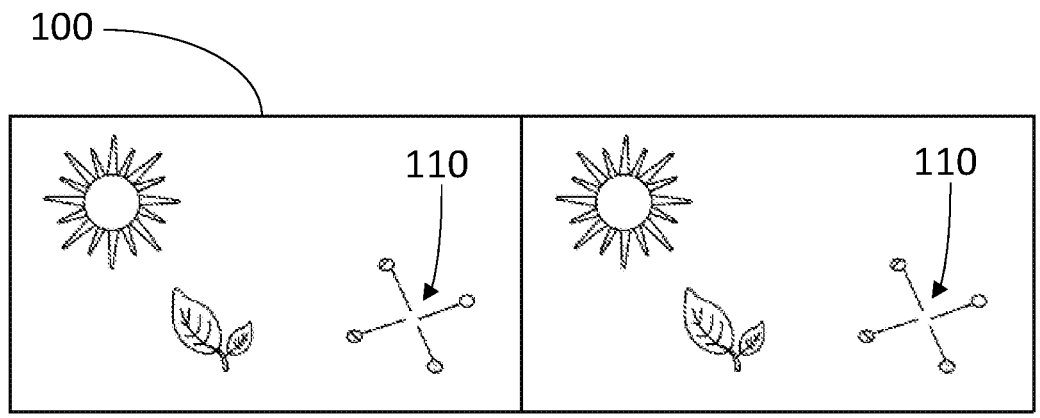
FIG. 3A is a view observed and captured by the cameras of the HMD.
Figure 3B:
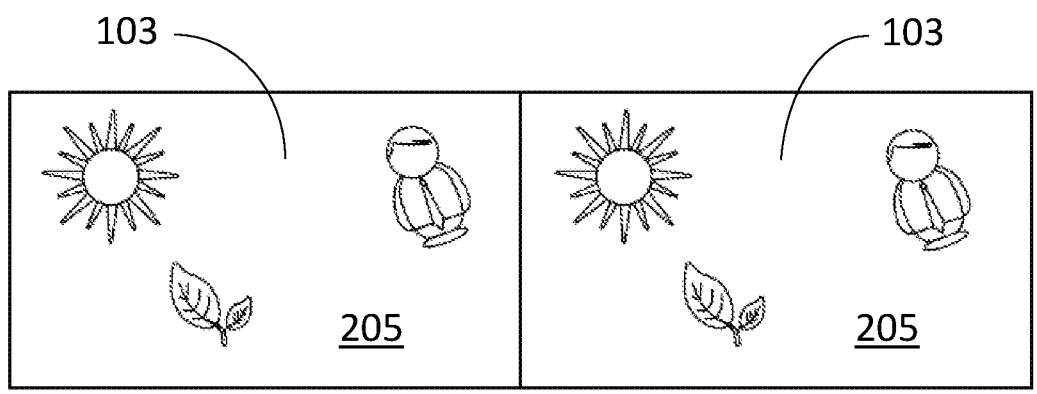
FIG. 3B illustrate views of an environment and for a user while wearing an HMD and looking at a screen panel display.

FIG. 3A and FIG. 3B illustrate views of an environment and for a user while wearing an HMD 100 and looking at a screen panel display 103. FIG. 3A is a view observed and captured by the cameras 101 of the HMD 100. FIG. 3A shows an example outdoor environment with a tracking device 110. A user will not be able to see the tracking device 110. Turning to FIG. 3B, the rendering algorithm 204 outputs an image 205 and superimposes a 3D model 206 on top of a camera stream displayed on the screen panel display 103. Consequently, a user views a 3D model 206 in place of the tracking device 110 on the screen panel 103. The display 103 is split into two parts for viewing with the left and right eyes.

Figure 4:
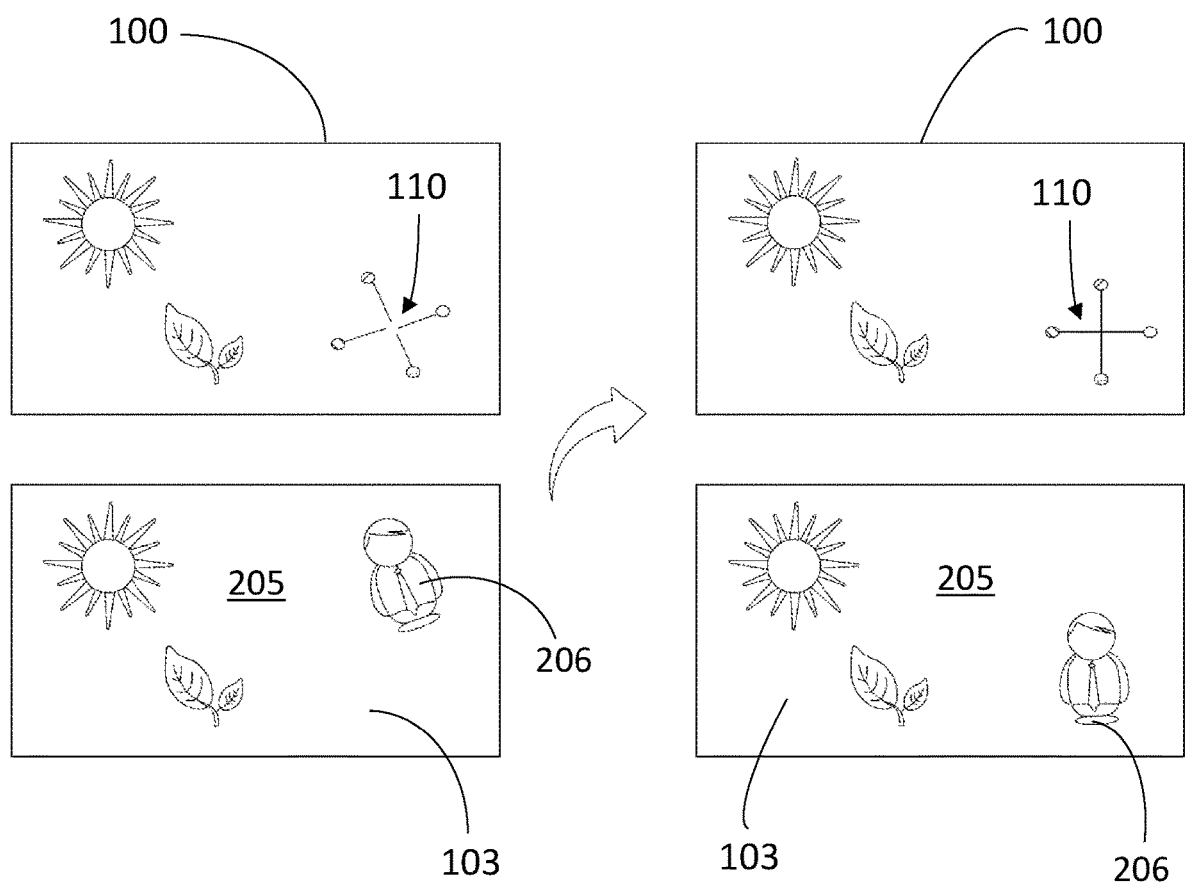
FIG. 4 illustrates how rotation of a tracking device is determined and displayed on a screen panel.

FIG. 4 illustrates how rotation of a tracking device is determined and displayed on a screen panel 103. The rotation and orientation of the tracking device 110 are determined using trigonometric functions applied to the coordinates of the positions of the LEDs 111 in the image frame data 201. The rendering algorithm 204 receives (input) the software object 203 including position, scale, rotation, and orientation of the tracking device 110. The rendering algorithm 204 generates an image 205 including a translated, scaled, and rotated three-dimensional (3D) model 206 on a background.

Figure 5:
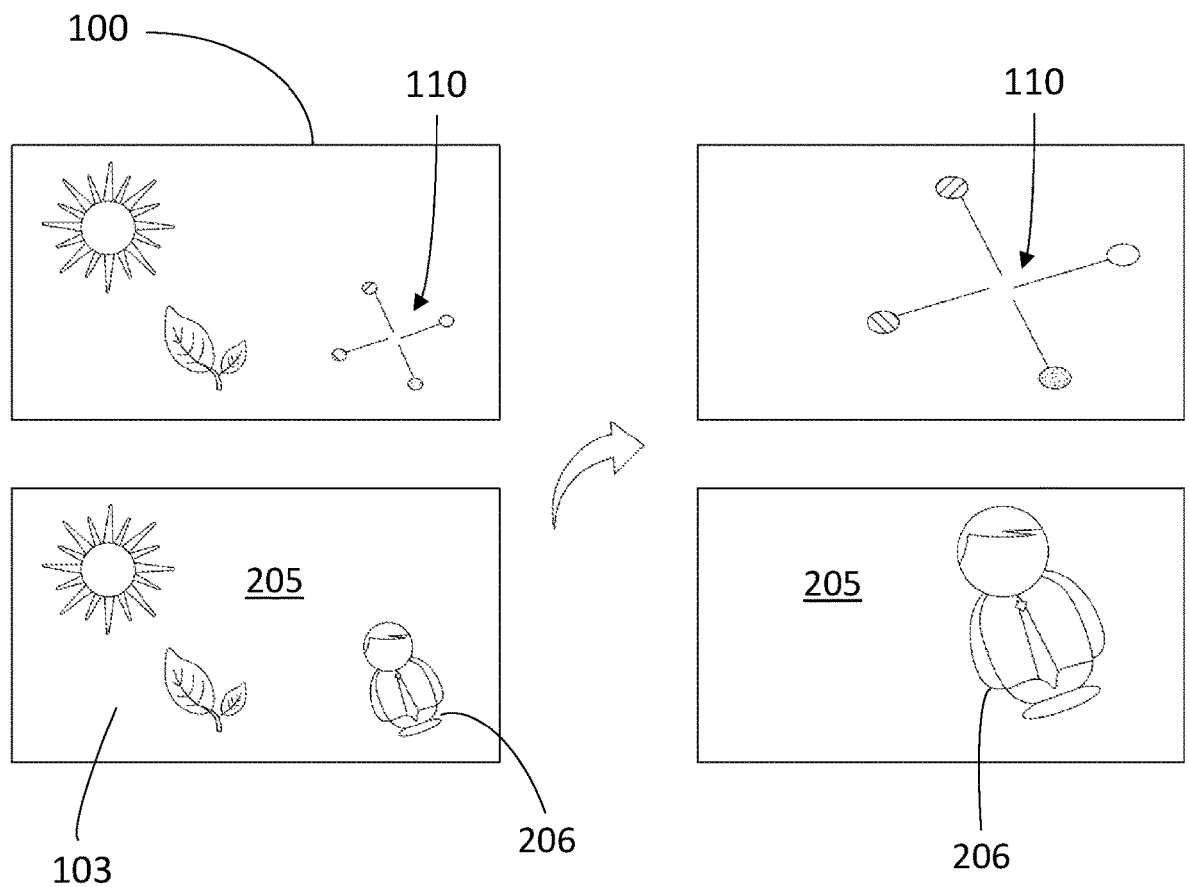
FIG. 5 illustrates how scale is determined by the relative size of a tracking device.

FIG. 5 illustrates how scale is determined by the relative size of a tracking device 110. As aforementioned, the detection algorithm 202 determines the scale by taking the largest vector size as a percentage of the total image size. This method provides an approximation of the distance between the HMD 100 and the tracking device 110. If the largest vector size is a high percentage of the total image size, it means the HMD 100 is closer to the tracking device 110.

Figure 6:
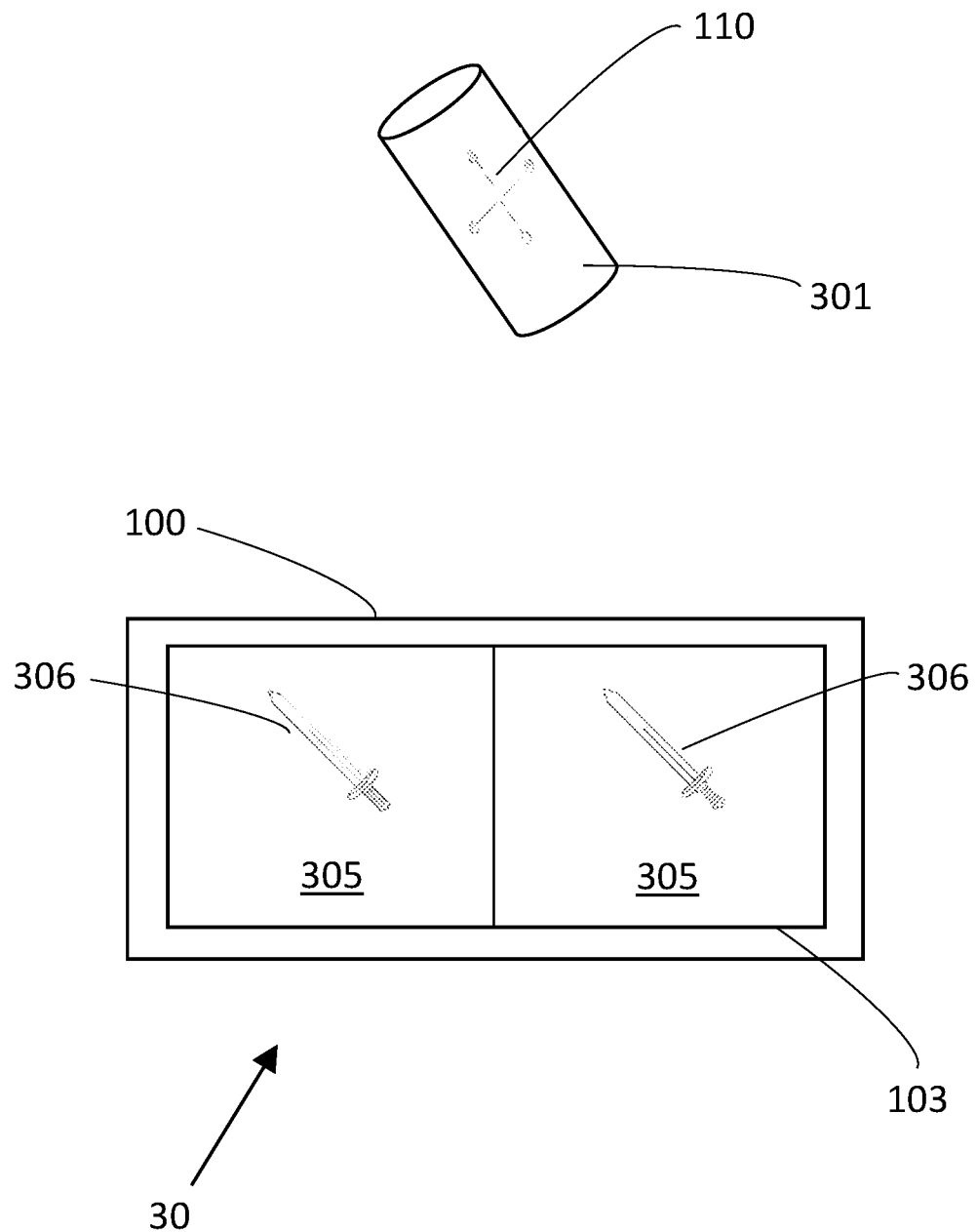
FIG. 6 illustrates a mixed reality system with a tracking device mounted on a handle of a gaming device for use in playing a video game.

There are many possible uses of mixed reality systems utilizing the HMD 100 and different tracking devices 110. FIG. 6 illustrates a mixed reality system 30 with a tracking device 110 mounted on a handle 301 of a gaming device for use in playing a video game. In this example, a 3D model 306 of an object such as a sword, lightsaber, gun, and the like can be generated by the rendering algorithm 204 and superimposed on the screen panel display 103. The user is able to move around their local environment virtually fighting enemies (e.g. dragons, zombies, space aliens, etc.) using the handle 301. As the user moves the physical handle 301, the tracking device 110 also moves and the 3D model 306 image moves on the screen panel 103. For games requiring more than one tracking device (e.g. multiplayer), multiplexing is required. One-way communication (using RF or optical modulation) from the tracking device 110 to the HMD 100 is required if specific, unique 3D model identifiers are configured for specific tracking devices 110. Individual tracking devices, each having unique 3D model identifiers, can be sold or traded as collectibles.

Rather than using a handle 301 of a gaming device, a tracking device 110 can be mounted to a sex toy device. Anchor points can be used to place the 3D model 306 in precise locations on the screen panel 103 corresponding to the tracking device 110. The 3D model 205 shown on the screen panel display 103 can be sexually explicit material in place of the tracking device 110. The scripting algorithm 206 can anchor the 3D model 306 to any point on the screen panel 103 relative to the tracking device 110 location. The scripting algorithm can also receive scripts, input (e.g. vocal) from the user. Based on the various inputs received, the scripting algorithm 206 can animate the 3D model 205, and/or enable the model 205 to speak (or provide other audio feedback). If multiple tracking devices 110 and sex toys are implemented, multiplexing is required. One-way communication (using RF or optical modulation) from the tracking device 110 to the HMD 100 is required if unique 3D model identifiers are configured for specific tracking devices 110.

Figure 7:
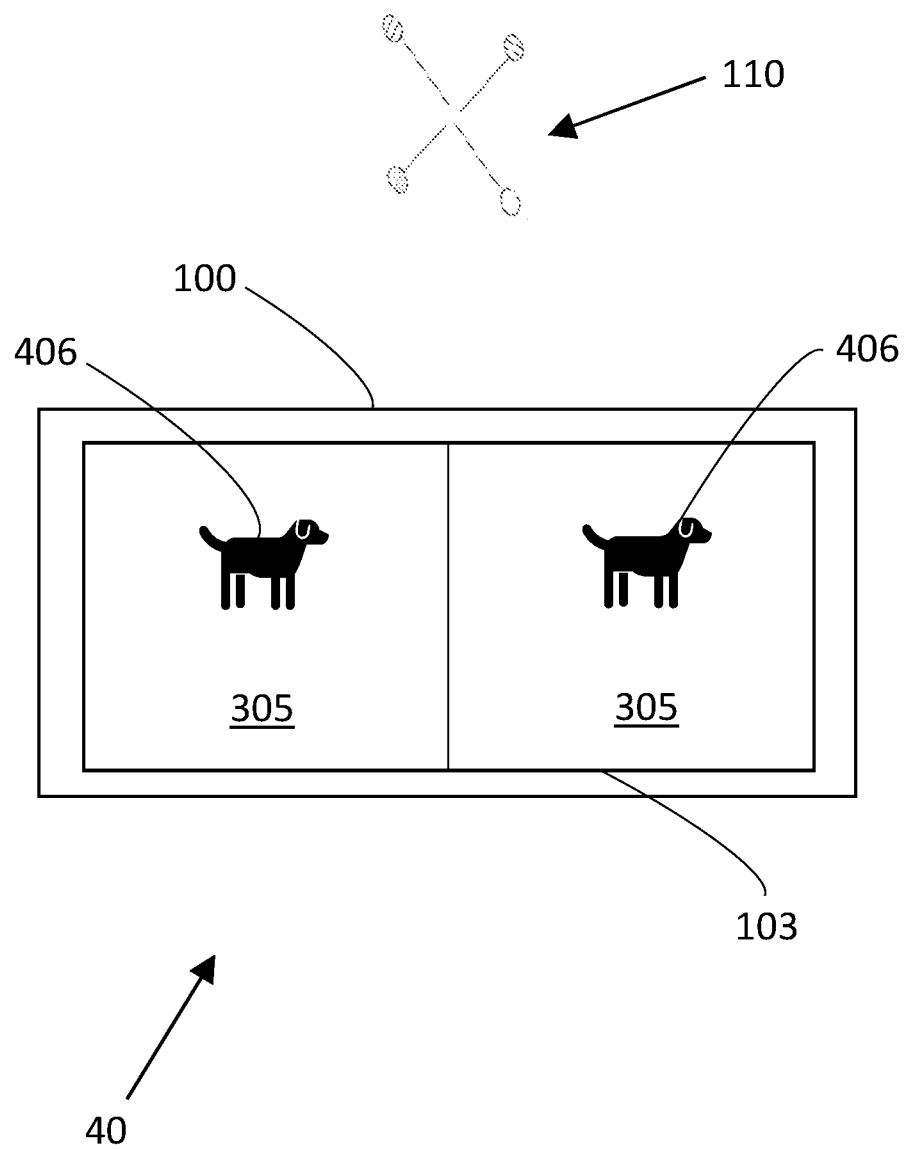
FIG. 7 illustrates a mixed reality system with a tracking device represented as a virtual pet on the screen panel.

FIG. 7 illustrates a mixed reality system 40 with a tracking device 110 represented as a virtual pet 406 on the screen panel 103. A user can interact with the virtual pet 406 by feeding, talking, exercising, playing games, etc. Data is collected and pet statistics (pet stats) can be raised or lowered based on user interactions. If multiple pets are displayed on the screen panel 103, multiplexing is required. One-way communication (using RF or optical modulation) from the tracking device 110 to the HMD 100 is required if unique 3D model identifiers are configured for specific tracking devices 110.

Figure 8:
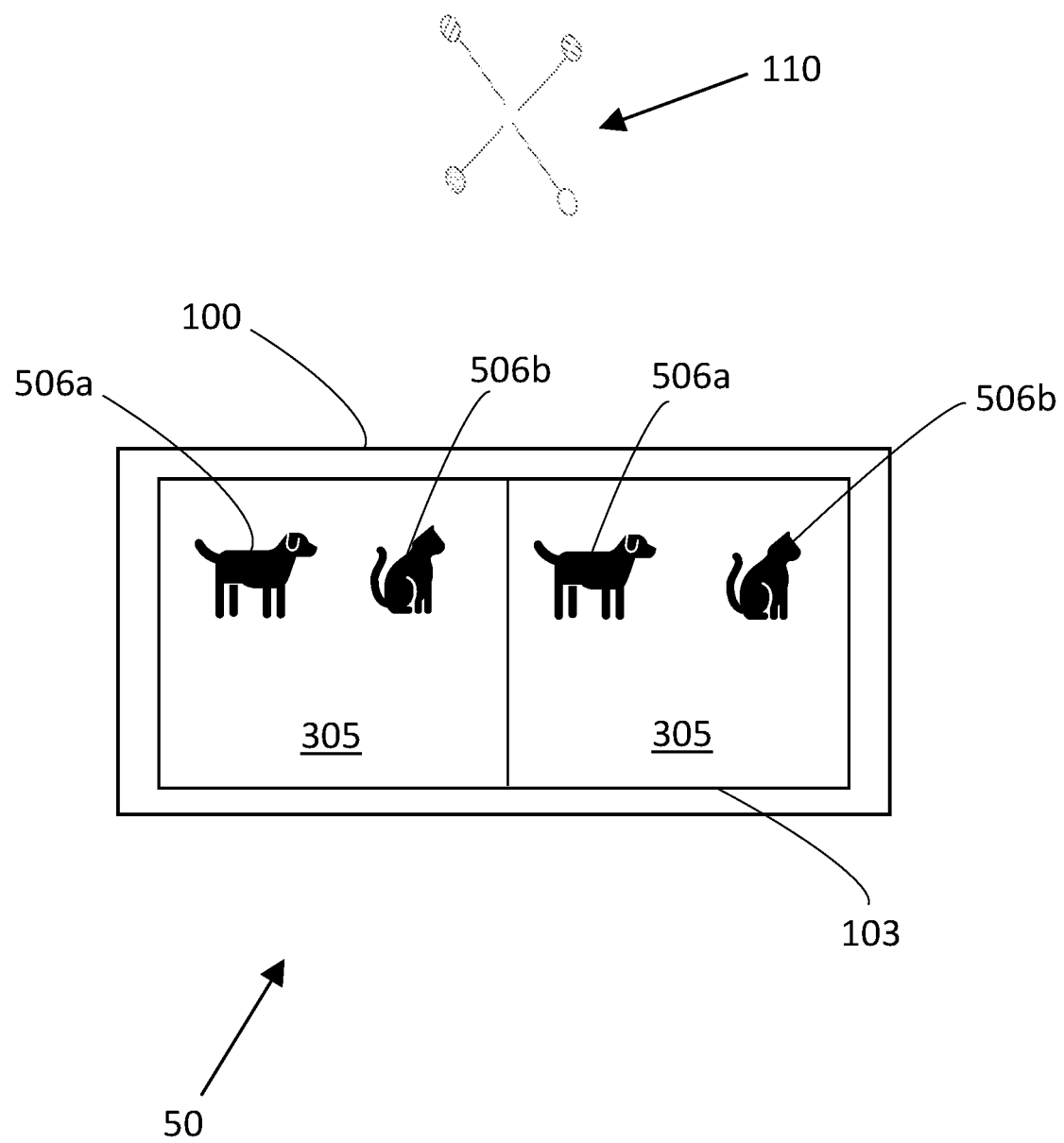
FIG. 8 illustrates a mixed reality system with multiple tracking devices and two users in an environment.

FIG. 8 illustrates a mixed reality system 50 with multiple tracking devices 110 and two users in an environment. In this example, each tracking device 110 is represented as a virtual pet 506a, 506b on the screen panels 103. Each screen panel 103 displays both tracking devices 110 as two different virtual pets 506a, 506b. Users can issue commands to the virtual pets 506 to perform tasks. For example, the virtual pets 506 can engage in a battle (or other competition) with rewards and penalties assessed depending on the outcome. One-way communication (using RF or optical modulation) is required if unique 3D model identifiers are configured for specific tracking devices 110. HMD 100 internet connectivity is required if one-way communications is not available. With HMD 100 internet connectivity, the unique 3D model identifier of a tracking device 110 can be transmitted to an online database. The online database can transmit 3D model and pet stats back to the HMD 100 for use in the pet competition. Data results of the competition can be transmitted and stored in the online database.

Figure 9:
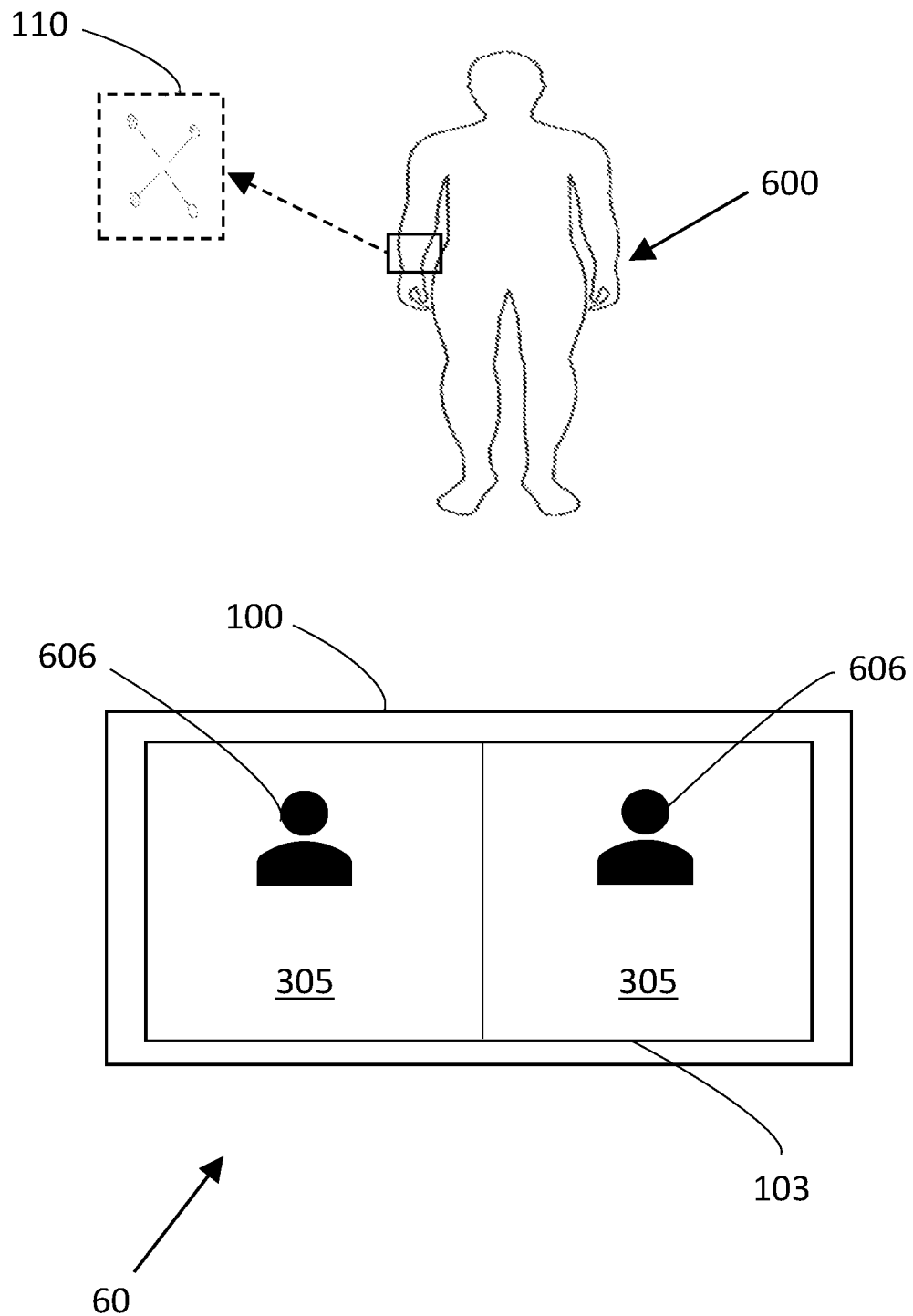
FIG. 9 illustrates a mixed reality system with a tracking device worn by a user.

FIG. 9 illustrates a mixed reality system 60 with a tracking device 110 worn by a user. In this example embodiment 60, a plurality of users wear tracking devices (pendants) 110 in addition to wearing HMDs 100. When the camera 101 of a user detects a tracking device 110 worn by another user, the other user will be displayed as a 3D model 606 (avatar) on the screen panel 103. In this example, a user 600 is wearing a tracking device 110 on his arm. Each user may select a unique avatar 606 to be displayed. Multiplexing is enabled to differentiate between multiple users wearing tracking devices 110. One-way communication (using RF or optical modulation) from the tracking device 110 to the HMD 100 is required if unique 3D model identifiers are configured for specific tracking devices 110. In this embodiment 60, it is possible to create in-person private disconnected (not online) ad-hoc social networks.

Another embodiment of the mixed reality system can include a robot wearing a tracking device 110. Tracking devices 110 can be mounted to robots to create immersive narratives for a user to view and experience. Different types and shapes of robots can be used for different purposes within the narrative. If a plurality of robots is implemented, multiplexing is required for the narrative. One-way communication (using RF or optical modulation) from the tracking device 110 to the HMD 100 is required if unique 3D model identifiers are configured for specific tracking devices 110.

In a further embodiment of the mixed reality system, the HMD 100 is connected to the Internet and linked to an online shopping account of a user. While browsing a product online, a user can click a button and a 3D model of the product is sent to the HMD 100. This enables a user to view the 3D model superimposed on a layout of the user's home displayed on the screen panel 103. The user can move the 3D model of the product around the user's home on the display 103. This enables the user to view the relative size of the product, how the actual physical product (e.g. furniture) would look in different locations, etc.

What is claimed is:

1. A mixed reality system comprising:
at least one tracking device;
the tracking device comprising a plurality of light emitting diodes (LEDs);
wherein the plurality of LEDs are placed at right angles to each other;
the tracking device is configured to transmit data to a computing device;
a head mounted display (HMD) device comprising:
a. a display;
b. the computing device comprising a processor, a memory, and a software application;
c. the software application comprising a detection algorithm, a rendering algorithm, and a scripting algorithm;
d. at least one camera configured to capture image data and transfer the image data to the computing device;
e. the computing device is configured to project the image data on the display;
f. the camera is further configured to detect the tracking device and transfer tracking device data to the computing device;
g. the detection algorithm is configured to receive the tracking device data as input;
h. the detection algorithm is further configured to process the tracking device data and output a software object comprising position, scale, rotation, and orientation of the tracking device;
i. the rendering algorithm is configured to receive the software object as input;
j. the rendering algorithm is further configured to output a tracking device image comprising a translated, scaled, and rotated three-dimensional (3D) model on a transparent background;
k. wherein the 3D model is superimposed over the image data on the display;
l. an additional bank of LEDs enabling multiplexing; and
m. wherein the tracking device is configured to transmit data to the computing device via optical modulation.

2. A mixed reality system comprising:
at least one tracking device;
the tracking device comprising a plurality of light emitting diodes (LEDs);
wherein the plurality of LEDs are placed at right angles to each other;
the tracking device is configured to transmit data to a computing device;
a head mounted display (HMD) device comprising:
a. a display;
b. the computing device comprising a processor, a memory, and a software application;
c. the software application comprising a detection algorithm, a rendering algorithm, and a scripting algorithm;
d. at least one camera configured to capture image data and transfer the image data to the computing device;
e. the computing device is configured to project the image data on the display;
f. the camera is further configured to detect the tracking device and transfer tracking device data to the computing device;
g. the detection algorithm is configured to receive the tracking device data as input;
h. the detection algorithm is further configured to process the tracking device data and output a software object comprising position, scale, rotation, and orientation of the tracking device;
i. the rendering algorithm is configured to receive the software object as input;
j. the rendering algorithm is further configured to output a tracking device image comprising a translated, scaled, and rotated three-dimensional (3D) model on a transparent background;
k. wherein the 3D model is superimposed over the image data on the display;
l. a gaming device;
m. the tracking device is mounted on top of a handle of the gaming device;
n. a 3D model of the gaming device is shown instead of the tracking device in the display of a user; and
o. each tracking device is uniquely correlated to the 3D model.

* * * * *